United States Patent [19]

Mason

[11] E Re. 30,168

[45] Reissued Dec. 18, 1979

[54] END PLUG FOR ROLLED MATERIALS

[75] Inventor: Henry L. Mason, Westport, Conn.

[73] Assignee: Precision Plastic Industries Inc., Bridgeport, Conn.

[21] Appl. No.: 944,885

[22] Filed: Sep. 22, 1978

Related U.S. Patent Documents

Reissue of:

[64] Patent No.: 4,015,711
Issued: Apr. 5, 1977
Appl. No.: 565,246
Filed: Apr. 4, 1975

U.S. Applications:

[63] Continuation-in-part of Ser. No. 465,762, May 1, 1974, abandoned.

[51] Int. Cl.[2] ..... B65D 85/67; B65D 85/672; B65D 85/676; B65D 85/677

[52] U.S. Cl. ..... 206/413; 206/416; 242/68.6

[58] Field of Search ..... 206/397, 408, 413–416, 206/389; 242/68.6, 118.31, 118.61; 53/27–30

[56] References Cited

U.S. PATENT DOCUMENTS

| | | | |
|---|---|---|---|
| 1,489,498 | 4/1924 | Leslie | 226/416 |
| 1,919,769 | 7/1933 | Brown et al. | 242/68.6 |
| 2,794,546 | 6/1957 | Miller | 206/397 |
| 2,797,804 | 7/1957 | Pomeroy et al. | 206/413 X |
| 3,260,362 | 7/1966 | Schwinne | 206/413 |
| 3,353,660 | 11/1967 | Will | 206/413 |
| 3,521,833 | 7/1970 | Ridgeway et al. | 242/118.61 |
| 3,567,146 | 3/1971 | Arenson | 242/68.6 |
| 3,627,220 | 12/1971 | Vogel | 242/68.6 |
| 3,627,221 | 12/1971 | Nichols et al. | 242/68.6 |
| 3,685,644 | 8/1972 | Cothran | 206/413 |
| 3,840,194 | 10/1974 | Vetter | 242/68.6 |
| 3,924,743 | 12/1975 | Bittner | 206/389 |

FOREIGN PATENT DOCUMENTS

| | | | |
|---|---|---|---|
| 888860 | 2/1962 | United Kingdom | 206/413 |

*Primary Examiner*—Leonard D. Christian
*Attorney, Agent, or Firm*—Watson, Leavenworth, Kelton & Taggart

[57] ABSTRACT

A new concept of end plugs which are circular, concentric and symmetrical containing flanges at particular angles in front and back to produce a mechanical strength, is disclosed.

6 Claims, 12 Drawing Figures

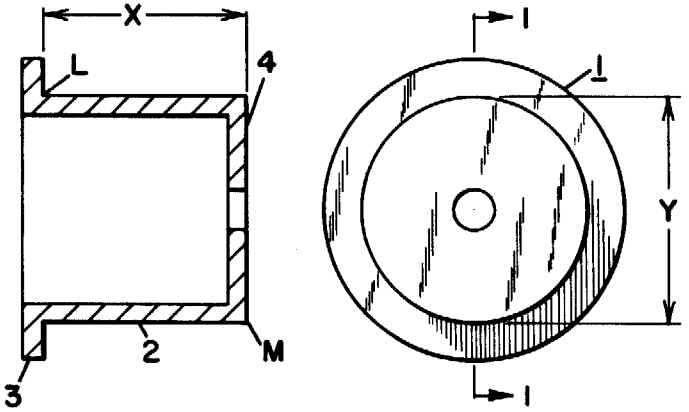
FIG. 1
FIG. 2
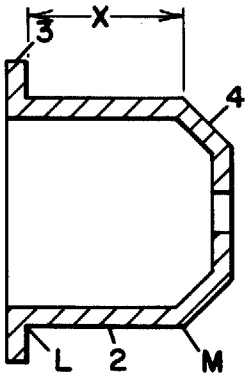
FIG. 3
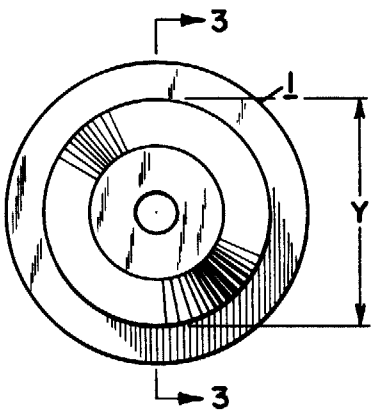
FIG. 4
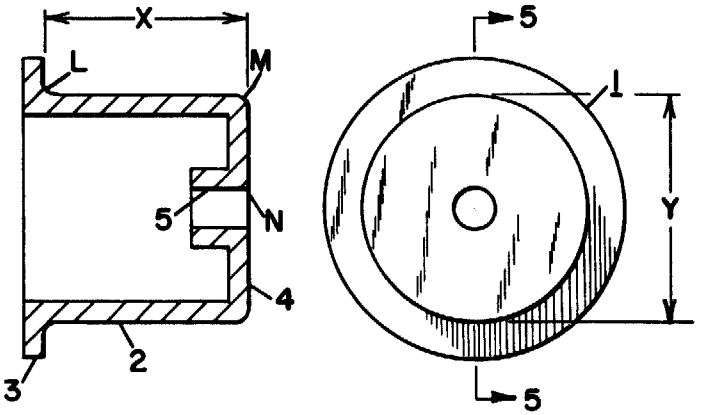
FIG. 5
FIG. 6
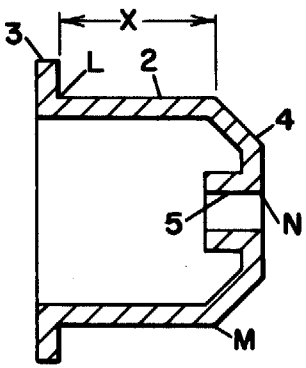
FIG. 7
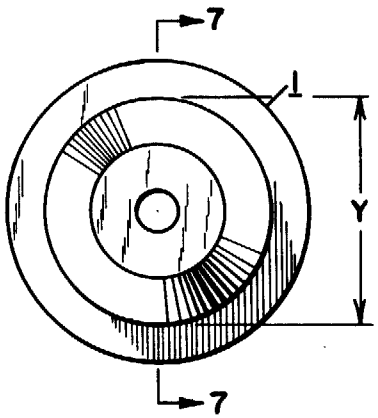
FIG. 8

END PLUG FOR ROLLED MATERIALS

Matter enclosed in heavy brackets [ ] appears in the original patent but forms no part of this reissue specification; matter printed in italics indicates the additions made by reissue.

This application is a continuation in part of application Ser. No. 465,762, filed May 1, 1974 by Henry L. Mason and now abandoned.

This invention relates to an improved end plug for shipping reels of material, or rolls of material, such as tape, paper rolls, or rolls of plastic sheets. The new end plug design is such that the end plug is vastly superior in strength to any end plug heretofore used. In fact, the end plug will no longer be the weakest point in the packaging, being stronger than the end plate of a typical packaging product.

It is known in the art that an end plug, which is not an integral part of the end plate of the package for rolls of material, is the typical package concept for heavy rolls of sheet goods. Heretofore, numerous designs have been set forth for end plugs including those found in U.S. Pat. Nos. 3,353,660 to G. H. Wills issued Nov. 21, 1967; 2,269,939 to Janisch issued Jan. 13, 1942; 1,487,633 to F. G. Washburn issued Mar. 18, 1924; and 3,710,539 issued to Cothran and Kirk Jan. 16, 1973; and, in addition, 3,083,928 issued to M. C. Voissem on Dec. 2, 1963. An inspection of these patents will show numerous designs of what is known in the industry as end plugs, some with fluted edges, some with multiple internal ribbings, and some of metal to be driven within the roll itself. However, other than the metal end plug which is used in a different art with a wooden roll, these end plugs have been found to be weak and fail in the flexion mode due to the end plug deforming into a non-circular shape causing the rolls of paper, sheet goods, film or tape to be dropped and damaged upon impact within the shipping container. Therefore, it has long been felt that an end plug which would not be subject to this type of failure in normal service would serve a needed purpose in the art.

It is an object of this invention to supply an end plug, simple in design, which will not, under normal use and with a normal roll of sheet goods whether paper, plastic, film or tape, fail in the flexure and compression mode.

It is another object of this invention to supply end plugs which are of a simple shape and yet structurally twice as strong, as any design heretofore known.

Other objects of this invention will become clear to those skilled in the art by reading the following description of the invention.

If one will refer to the FIGS. 1–12, which illustrate six concepts within this invention, one will note that FIGS. 1 and 2; 3 and 4; 5 and 6; 7 and 8; 9 and 10; and 11 and 12 are paired side sectional views and front views of six distinct examples of the end plug of this invention.

FIG. 2 is a front view of an end plug showing the circular, concentric, and symmetrical design of the plug. FIG. 1 is a section through the diameter of the end plug shown in FIG. 2, distinctly showing the relationship between the second flange, sleeve, and back flange of the end plug.

FIG. 3 is a similar section of the end plug shown in front view in FIG. 4 where the front flange contains two slopes with respect to the sleeve.

FIG. 5 is a similar section of the end plug shown in front view of FIG. 6 where an inner sleeve is added.

FIG. 7 is a sectional view of the end plug shown in the second view in FIG. 8 and combines an inner sleeve and a second flange of two slopes.

Figure 9:
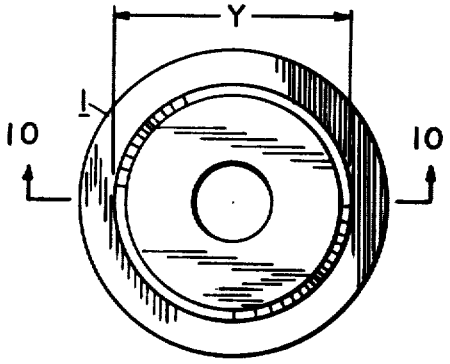
FIG. 9 is a second view of an end plug shown in cross section in FIG. 10. This end plug depicts the lack of taper of the sleeve for a distance H beyond the back flange.

More particularly, it has been found that where the sleeve, item 2, of the end plug, item 1, is perpendicular to the continuous back flange, item 3, and the continuous second flange, item 4, that an end plug is achieved with considerable strength in flexion. This is the equivalent of ribbing running concentric to the sleeve resulting in the increased strength observed.

It has been found that where an end plug is used to carry a "standard" roll of polyester film, the sleeve should usually be no less than one inch long from the base of the back flange to the top of the second flange and usually no longer than six inches, dimension X in FIG. 1. The preferred embodiment for standard end plugs wherein the diameter, dimension Y in FIG. 2, is approximtely 5 to 7 inches, is to have the sleeve length, X, within a 2 to 7 inch range. Naturally, this distance can be maintained by recessing the front flange so that it is a smaller distance from the back flange than the length of the sleeve. Thus in FIGS. 11 and 12, the distance from the top of the back flange to the end of the sleeve X is greater than P, the distance from the top of the back flange to the top of the front flange. P is never greater than 6 inches, whereas X may be 7 inches or longer. The recessed second flange is a preferred embodiment since it allows one to have a long sleeve for ease of roll mounting, but retains the second flange near the stress area of the end plug for the needed strength. That is, the stress points of the end plug occurs near the back flange which engages the packaging container. The preferred P distance is between 1 and 4 inches.

Naturally, X will, to a great extent, vary in proportional relationship to Y, the diameter of the plug, depending upon the depth of insertion into the roll to result in a stable package. Thus, in a small plug where the Y dimension is only 2½ inches, the sleeve dimension X will preferably be in a range of ½ to 5 inches; however, the X dimension may be greater than 5 inches if package stability requires it.

As indicated above, in order to achieve the proper structural and flexural strength, it is imperative that a continuous back flange which is perpendicular, 90° plus or minus 10°, to the sleeve be provided and that, in addition to a second flange, wherein at least a portion of said flange is nearly perpendicular, that is at an angle of between 80° and 100°, to the sleeve is provided. This configuration has been found to add rigidity to the end plugs, thus allowing even distribution across the end plug sleeve of the downward force of the roll being stored upon the end plug. The second and rear flanges, although rather light in total weight add sufficient structural strength to enable this configuration to exceed the strength of the normal side boards used in a packaging container for film or paper, and the strength of standard end plugs.

In addition to adding structural strength, the back flange, item 3, also aids in maintaining the horizontal stability of the packing configuration, since it does not allow the end plugs to pass through the side board of the packaging container and keeps the roll in a proper position within the packing container.

Figure 11:
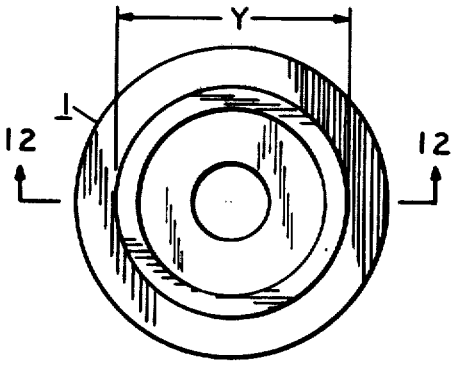
FIGS. 11 and 12 show an end plug of the invention where the second flange has been recessed within the sleeve.
Figure 12:
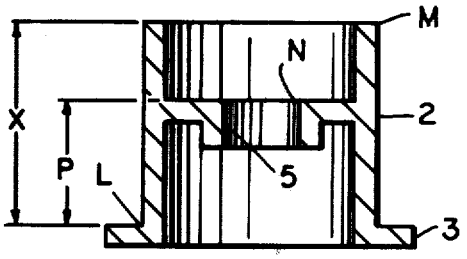

Referring now to FIG. 3, the basic design and concept of structural strength is provided; however, one additional angle is added by having the front flange at an angle less than 90° prior to becoming perpendicular to the sleeve. The first angle of the front flange in this configuration is no less than 15° and no greater than 75° to have added structural strength. However, any combination of angles, so long as the second flange has a good portion of its overall width, 20% or more its area, perpendicular to the sleeve is contemplated. Preferably at least 40% of the area of the second flange is perpendicular to the sleeve. These angular relationships for the second flange hold even if the recessed design of FIGS. 11 and 12 is used.

Referring to FIGS. 5 and 7, cross-sections of two additional examples of end plugs of this invention, an additional item is added for more strength, item 5. Item 5, called an inner sleeve, is a third surface perpendicular to the second flange and parallel to the sleeve. This inner sleeve gives added strength.

In a preferred embodiment of this invention, the intersection of the surface of the sleeve and the back flange, intersection L, or the sleeve, with the second flange in non-recessed end plugs, intersection M, is rounded into a convex or concave radius. The use of a radius instead of the surfaces meeting at a sharp angle will further enhance the strength of the end plug. This invention contemplates the mold for the end plug being built to introduce a rounded surface intersection. Although the radius of the surface intersection is not critical, it usually will be less than ¼ inch. It is contemplated that the intersection of the second flange and the inner sleeve, intersection N, will also be rounded in accordance with the above description.

Figure 10:
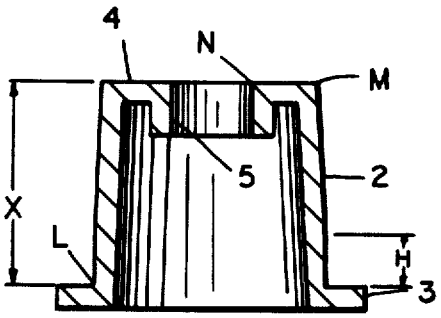

Finally, it has been found that end plugs of the greatest strength within the invention of the application, are achieved where the thickness of the sleeve, as shown in FIG. 10, is increased by keeping the outer surface of the sleeve exactly perpendicular to the back flange, whereas the inner surface follows the small taper associated with injection-molded pieces, that is, it is at an angle of at most 10° off the perpendicular. This thickened portion is only H dimension long, usually 1/10 to ½ of the sleeve length X. The preferred end plug of this invention would have said thickened sleeve as shown in FIG. 10 and, in addition, the recessed second flange as shown in FIG. 12.

Having thus described my invention, I claim:

1. An improved end plug for a rolled goods packaging container which comprises a [circular cylinder known as a] *cylindrical* sleeve having an external surface upon which the rolled goods are placed and an internal surface, [which is] *said sleeve being* concentric to and around a symmetrical axis with a continuous back flange, said back flange being nearly perpendicular to the sleeve[;], the outer diameter of said back flange [is] *being* greater than the sleeve, and a second flange attached continuously to the sleeve [at] *and recessed therein inwardly a distance from* the front of said sleeve, said second flange being concentric to and symmetrical with said sleeve and at least 20% of the area of said second flange being perpendicular to said sleeve, *a first portion of the external surface of* said sleeve being at an angle of 90° to the back flange for a distance *extending from said back flange of said sleeve* of up to one-half of the sleeve length and [then] *the remainder portion of said sleeve external surface* tapers [at an angle of up to 10% off the vertical] *with a taper of up to 10° inwardly toward said symmetrical axis* and the internal surface *of said sleeve* tapers [at an angle of up to 10° off the vertical with respect to the back flange in the direction of the symmetrical axis] *with a taper of up to 10° inwardly toward said symmetrical axis and from said back flange in the direction of said second flange.*

[2. An end plug according to claim 1, wherein the second flange is recessed within the sleeve.]

3. An end plug for a rolled goods packaging container which comprises a [circular cylinder known as a] *cylindrical* sleeve having an external surface upon which the rolled goods are placed and an internal surface, [which is] *said sleeve being* concentric to and around a symmetrical axis with a continuous back flange, said back flange being nearly perpendicular to the sleeve[;], the outer diameter of said back flange [is] *being* greater than the sleeve, and a second flange attached continuously to the sleeve [at] *and recessed therein inwardly a distance from* the front of said sleeve, said second flange being concentric to and symmetrical with said sleeve and at least 20% of the area of the said second flange being perpendicular to said sleeve, and in addition an inner sleeve parallel to said *first* sleeve and perpendicular to said second flange *and* attached continually to said second flange at the point of intersection [to] *of* said second flange and inner sleeve.

4. An end plug in accordance with claim 1 wherein the entire area of said second flange is perpendicular to said sleeve.

[5. An end plug according to claim 3, where the said second flange is recessed within the sleeve.]

[6. An end plug in accordance with claim 4 wherein said sleeve tapers at an angle of up to 10° off the vertical parallel to the internal surface of the sleeve for its entire length and said taper is at an angle of up to 10° off the vertical with respect to the back flange in the direction of the symmetrical axis, containing in addition an inner sleeve parallel to said sleeve and perpendicular to the said second flange attached continually to said second flange at the point of intersection of said second flange and inner sleeve.]

7. An end plug according to claim 1, wherein the intersection of surfaces comprising the sleeve and back flange meet in a concave radius and the intersection of the surfaces of the sleeve and *the* second flange meet in a convex radius.

8. An end plug according to claim 3, wherein the intersection of surfaces comprising the sleeve and back flange meets in a concave radius and the intersection of the surface of the sleeve [in] *and* the second flange meet in a convex radius.

[9. An end plug in accordance with claim 1 wherein said sleeve for a portion of its entire length tapers at an angle up to 10° off the vertical with respect to the back flange and is concentric around the central axis of said plug and, in addition, said second flange is recessed within the sleeve.]

[10. An end plug in accordance with claim 9 wherein, the entire area of the second flange is perpendicular to said sleeve.]

11. An end plug in accordance with claim 1 wherein, in addition there is an inner sleeve parallel to said *first* sleeve and perpendicular to said second flange attached continually to said second flange at the point of intersection of said second flange and the said inner sleeve.

[12. An end plug in accordance with claim 10 wherein in addition there is an inner sleeve parallel to said sleeve and perpendicular to said second flange attached continually to said second flange at the point of intersection of said second flange and inner sleeve.]

[13. An end plug according to claim 1 wherein the second flange is recessed within the sleeve and said second flange for its entire area is perpendicular to said sleeve.]

[14. An end plug according to claim 1 wherein the second flange is recessed within the sleeve, wherein the entire area of said second flange is perpendicular to said sleeve, and an inner sleeve parallel to said sleeve and perpendicular to said second flange, attached continually to said second flange at the point of intersection of said second flange and said inner sleeve.]

* * * * *

UNITED STATES PATENT AND TRADEMARK OFFICE

CERTIFICATE OF CORRECTION

PATENT NO. : RE 30,168

DATED : December 18, 1979

INVENTOR(S) : Henry L. Mason

It is certified that error appears in the above-identified patent and that said Letters Patent are hereby corrected as shown below:

In Col. 2, line 31, "approximtely 5 to 7 inches," should read --approximately 5 to 7 inches,--.

In Col. 4, line 29, claim 3, "of the said" should read --of said--.

In Col. 5, line 1, claim 11, "with claim 1 wherein," should read --with claim [9] 1 wherein,--.

Signed and Sealed this

First Day of April 1980

[SEAL]

Attest:

SIDNEY A. DIAMOND

Attesting Officer

Commissioner of Patents and Trademarks